United States Patent [19]

Smith

[11] Patent Number: 4,930,907
[45] Date of Patent: Jun. 5, 1990

[54] STIFF AIR BEARING FOR LARGE RADIAL LOAD

[76] Inventor: Robert S. Smith, 1263 Emory St., San Jose, Calif. 95126

[21] Appl. No.: 293,660

[22] Filed: Jan. 5, 1989

[51] Int. Cl.$^5$ ............................................. F16C 32/06
[52] U.S. Cl. ...................................... 384/118; 384/120
[58] Field of Search ............... 384/118, 110, 399, 448, 384/119, 123, 120

[56] References Cited

U.S. PATENT DOCUMENTS

| 3,749,456 | 7/1973 | Whitaker | 384/118 |
| 4,371,216 | 2/1983 | Suzuki et al. | 384/118 |
| 4,685,813 | 8/1987 | Moog | 384/448 |
| 4,696,585 | 9/1987 | Swearingen | 384/399 |

Primary Examiner—Lenard A. Footland

[57] ABSTRACT

An axially symmetric journal air bearing having areas on the internal surface of the stator, isolates pressure-wise from other areas, having selected dimensions and means to apply selected pressures to said areas, wherein said selected dimensions and pressures are selected to maintain equilibrium of the rotor when it is subject to a large radial load.

29 Claims, 7 Drawing Sheets

STIFF AIR BEARING FOR LARGE RADIAL LOAD

FIELD OF THE INVENTION

This invention relates to air bearings and especially to air bearings requiring improved stiffness and intended to support a large radial load.

PRIOR ART

Airbearings have been used for many applications where minimal runout and very low friction are required. Two categories of air bearings may be recognized—the slider and the journal air bearing.

In order to describe the differences in approach between journal and slider bearing design, it is useful to recognise two diffeent origins of pressure between two parallel surfaces arising from the fluid lubricant that is contained between them. One type of support arises from hydrostatic forces which may be expressed in terms of the pressure that can be exerted by stationary pressureized fluid and is exerted even in the absence of fluid flow. The second is hydrodynamic which is generated by viscous forces that result from flow of the lubricant through the bearing area. In the design of a slider bearing, a large area of hydrostatic pressure is maintained by a groove around the area that supplies air from a pressureized source. The area bounding this air passage groove on the other side of the groove opposite the area of hydrostatic pressure is characterized by the large velocity of air escaping to the ambient environment so that a hydrodynamic component of pressure is generated.

The typical journal bearing of the prior art comprises a cylindrical rotor housed within a stator having a cylindrical cavity concentric with the rotor. The rotor also has attached at each end a thrust plate having an internal flat surface adjacent to the end surface of the stator If hydrostatic pressure is imposed in the bearing region, then it will be uniform circumferentially around the boundary of the rotor independent of variation of spacing between the rotor and stator surface such as might result from eccentric displacement of the rotor and stator axes. Therefore the hydrodynamic pressure generated by flow of the fluid must be relied upon to maintain separation of the srfaces. As separation of bounding surfaces is decreased such as when a rotor is displaced eccntrically, increased hydrodynamic pressure on the restricted side of the bearing increases so that the increased pressure tends to restore concentricity. Because of the reliance on hydrodynamic forces which arise from the viscosity of the fluid, the clearance between the air bearing surfaces must be very small—typically one ten thousandth of an inch. For further discussion, see, for example, see "Gas Lubricated Bearings" by Grassam and Powell, published by Butterworth, London, 1964.

The small viscosity of air in spite of the small clearance that is provided imposes a severe limit on the radial load that can be supported by bearings of the prior art. For example, a bearing four inches diameter and about four inches long will support 200 pounds in the axial direction but only 25 pounds in the radial direction on one end of the rotor.

One approach to increasing stiffness of the bearing is a construction in which a ahemispherical construction replaces the flat plate construction described above. This bearing has been manufactured by the Fox International Co. in Hayward, Calif.

U.S. Pat. No. 3,722,996 discloses a pressure compensator which senses pressure changes to control air flow to the air bearing a area.

Typical slider constructio comprises a a U shaped channel slideably straddling a bar with air bearings between adjacent surfaces. Fixed bearings are positioned along one side of the bearing while the opposite side has a bearing supported by a piston in order to compenste for deviation from parallelism of the sides of the bar. This "post and piston" bearing construction is manufactured by Fox International, Haywrd, Cal.

Standard practice is to positon a jewelled "donut" having a fine orifice in the air supply passage close to the bearing area in order that pressure be be very responsive to changes of space between the bearing surfaces. However, the great rate of air velocity through the orifice (having a small cross section and length, causes a condition known as air hammer—i.e., vibrations that cannot be tolerated. Bearings with jewelled orifices are manufactured by Fox International, Hayward, Cal.

OBJECTS

It is an object of this invention to provide an air bearing with improved stiffness particularly with regard to radial load on one or both ends of a rotor that is substantially larger than that of air bearings of the prior art.

It is a further object to provide a bearing that is easy to manufacture with regard to acheiving tolerances required for small bearing spaces.

Another object is is to provide a bearing wherein a compensating thrust and torque is generated to maintain clearance of bearing spaces when a radial load is applied.

Another object is to provide compensating torques and forces by automatic means responsive to variations of force and direction of the applied radial load.

Still another object is to provide an air bearing that avoids the problems of air hammer associated with the prior art.

SUMMARY

In accordance with this invention, a journal air bearing comprises a rotor having axial symmetry. The bearing also comprises stator enclosing the rotor in a chamber whose walls have pattern of areas where each area is bounded by grooves connected to ambient pressure and each area is connected by an air passage to an air supply so that pressure in each area can be controlled independent of pressure to other areas. The location and size of each area is selected so that the total force and moment exerted on the rotor is zero.

The rotor having axial symmetry includes the standard cylindrical shape and also a novel conical shape which will be shown to provide a special advantage for acheiving the close tolerance of bearing spaces.

The means to supply pressureized air and the size and location of the areas depends on the application.

In order to provide maximum control of air flow to the bearing area while avoiding the air hammer associated with jewelled orifices of the prior art, a variable impedance in the air passage is disclosed comprising a tapered chamber with variable cross section.

In the case where the force, magnitude, direction and point of application are constant and predetermined, one pressurized area is established in an area of stator-rotor interface at a location on the side of the stator opposite to the point of application of applied force and another area is established on the same side as the point of application of the applied force but farther away than the opposing pressureized area. The size and location of the pressureized areas can be selected so that both areas can be supplied by the same pressureized air source. the pressure and radial force can be applied before the rotor is spun.

In the case where the magnitude of applied force varies, but the force is applied in a constant direction at a constant location on the shaft of the rotor, then balance of forces and moments can be achieved by constructing two air bearing areas on the same side of the rotor as the applied load and two areas on the opposite side so that two opposing airbearing areas are at one end of the rotor and the other two are at the opposite end. Air pressure is applied to each area except that a single throttle reduces pressure to two areas, one area closest to the point of application of the load and the other fartherest from the point of application of the load. Reduction of pressure is proportional to the applied radial load.

If the direction of the applied load changes (such as load applied to the end of a milling cutter in a machining operation), then there are four identical air bearing areas arranged circumferentially around each end of the rotor and two throttles are used. Each throttle controls pressure in a given area and its opposite member at the other end of the rotor in response to the component of the load parallel to the force exerted by the pressureized area.

A number of means may be used to sense the applied load and control air flow to the respective areas.

One means is applicable to the situation where the applied load is constant and known. In this case the pressure may be set manually before the rotor is rotated.

When the applied force changes, the force may be sensed electronically or hydraulically in order to throttle the pressure in the repective area. The type and location of the sensor depends on the application. An illustative example is a milling operation where the cutter is supported in an air bearing for high speed operation. In this application, the workpiece is held in a chuck and driven against a cutter suported in an air bearing spindle. The reactive force component exerted by the cutter can be sensed by sensing the current in the driving motor.

Another method is to sense the force against the chuck jaws holding the workpiece. In hydraulic sensing, each chuck jaw is a piston that transmits the reactive force against the jaw hydraulically to one of two compartments in a comparator so that the difference of pressures in each compartment (which is proportional to the resultant force of the workpiece against the rotor) moves a diaphram separating the two compartments and thereby transmits a pressure differential to one compartment of a second comparator. The second compartment of the second comparator communicates with a third comparator which senses the pressure difference between areas of the bearing. Movement of the diaphram between compartments of the second comparator controls the needle of a throttle valve thereby controlling air flow to the bearing area so that differntial pressure changes as the diphram moves until the radial force and differential air pressures are in equilibrium.

In electronic sensing, a strain gage is attached to each jaw of a chuck and senses the force of the rotor against the jaw. In order to sense pressure differential, a strain gage is attached to each side of the diaphram of a pnuematic comparator which has two compartments that communicate with opposing air bearing areas. A difference in pressures of the two areas shifts the diaphram which is detected by the strain gages. The four strain gages are legs of a wheatstone bridge and when the force from the rotor is out of balance with the pressure differential between the bearing areas, the output signal from the bridge activates a throttle controling air flow to the bearing areas in order to restore a balance of forces and moments on the rotor.

In another situation where it is desired to apply a load against one side of an air bearing, pnuematic pressure drives the load against the bearing in one direction and the same pneumatic pressure drives an air bearing surface against the opposite side of the bearing in order to impose a balance of forces.

Other means will occur to those skilled in the art depending on the application and all of these are embodiments of this invention.

BRIEF DESCRIPTION OF THE DRAWINGS

FIG. 17 shows another version of the situation of FIG. 16.

FIG. 19 shows an air bearing having a conical section.

FIG. 20 is another view of the air bearing of FIG. 19.

DESCRIPTION OF A PREFERRED EMBODIMENT

The following detailed description illustrates the invention by way of example, not by way of limitation of the principles of the invention. This description will clearly enable one skilled in the art to make and use the invention and describes several e embodiments, adaptations, variations and uses of the invention including what I presently believe to be the best mode of carrying out the invention.

Figure 1:
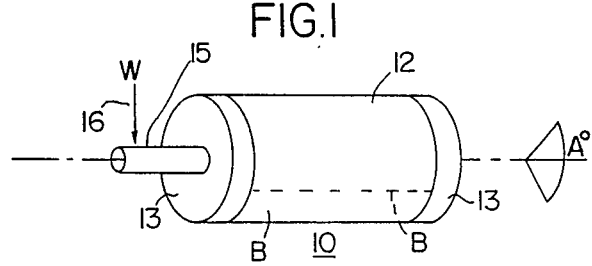
FIG. 1 shows an external view of the airbearing of this invention.
Figure 2:
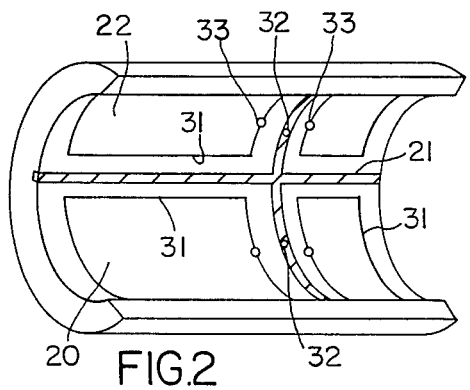
FIG. 2 shows a cutaway view of the stator.
Figure 4:
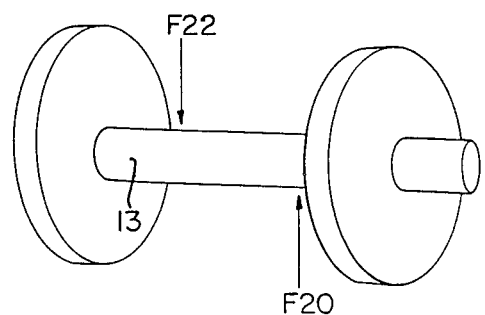
FIG. 4 illustrates the forces generated on the rotor by the configuration shown in FIG. 3.

Turning now to a detailed description of the drawings, thre is shown in FIG. 1 an isometric view of a jpurnal air bearing 10 of this invention. A stator 12 is shown having the shaft 15 of a rotor 13 protruding from one end. The rotor is enclosed in the stator in FIG. 1 however, the rotor can be seen to better advantage in FIG. 4. A radial load, W, is applied on the protruding end of rotor as indicated by the arrow 16. In FIG. 2 is shown a cut away view of the stator so as to expose the cylindrical interior and reveal areas having a pattern of grooves and air passages for distributing the air flow.

Referring to FIG. 2, each area, 20 and 22, is surrounded by air escape grooves 21 leading to ambient pressure 32 that isolates the surrounded area pressurewise from all other areas. Each area has air passages, 33, leading to an independent air supply so that pressure in any given area, distributed evenly by channels 31, can be controlled in accordance with the requirement that total force and moment on the rotor be zero in order that the rotor is out of contact with the stator and can rotate freely.

The selection of the pattern of areas and pressures depends on the special application of the bearing. Several examples will be described for illustrative purposes. The groove and passage patterns may be illustrated by imagining the stator to be cut along line B—B in FIG. 1 and opened and flattened so as to expose the cylindrical interior. Distance around the cylindrical interior of the stator is represented as AR, where R is the radius of the cylindrical interior wall of the stator and A is the anglular distance expressed in radians around the center line of the cylinder as illustrated in FIG. 1.

Figure 3:
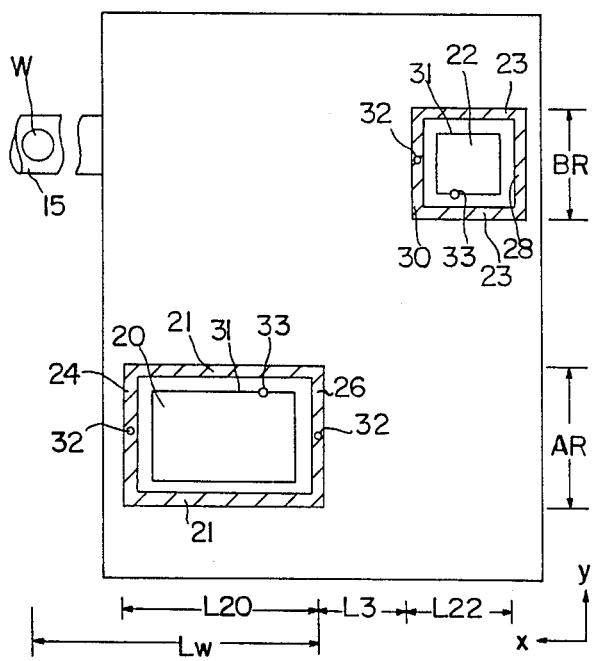
FIG. 3 shows a view of the interior of the "flattened" stator illustrating one pattern of air bearing areas when a pressure differential between two areas is designed to balance the rotor against a radial load.

A useful pattern and a preferred embodiment of this invention is illustrated by the "flattened" stator in FIG. 3. This pattern is useful when the load and direction of load are constant and can be applied before the rotor is rotated. The load on the rotor is represented by the cross, W. Two pressureized areas, 20 and 22, are shown bounded by straight grooves, 21 and 23 respectively. Area 22 is shown facing the same direction as the applied load, W, while area, 20 faces in the opposite direction. The force from area 20, F20, and area 22, F22, and load, W, on the rotor from the load, W, is further illustrated in FIG. 4 by the arrows representing the forces.

Dimensions and positions of the areas, defined below, are further illustrated by scales x and y in FIG. 3.

Area 20 is also bounded by a circumferential groove, 24, which is adjacent to the end of the cylindrical surface nearest the load, W, on the rotor shaft, 15, and a second circumferential groove, 26, which is spaced a distance L20 from groove 24. Passages 32 are shown for both areas which lead to ambient pressure. Straight grooves, 21 are spaced apart a distance of AR, measured circumferentially, where A is the angular span of area 20 expressed in radians and R is the radius of the interior cylindrical wall.

Area 22 is also bounded by a circumferential groove, 28, which is adjacent to the end of the cylindrical surface fartherest from the load and circumferential groove 30 which is spaced a distance L22 from groove 28. Straight grooves, 23 are spaced apart a distance, BR, measured circumferentially where B is the angular span of area 22 expressed in radians and R is the radius of the interior cylindrical wall.

Groove 30 is spaced a distance L3 from groove 26, measured parallel to the centerline of the cylindrical surface.

The load, W, is applied at a distance, Lw, from groove 24 measuring along the centerline of the cylindrical surface.

Air supply passages, 33, provide pressurized air to each area by way of channels 31 which are grooves that distribute the air uniformly over areas 20 and 22.

The force on the rotor from each pressurized area equals the projection of the area towards the rotor multiplied by the pressure in the area. If the pressure in area 20 is P, and the pressure in area 22 is P′, then in order that the total force on the rotor be zero, $$W = 2PR(L20)\sin(A/2) - 2P'R(L22)\sin(B/2)$$

In order for the moment on the rotor to be zero, $$W(Lw) = PR(L20)^2 \sin(A/2) + 2P'R[(L22)^2/2 + (L22)(L3)]\sin(B/2)$$

A useful case occurs when $P = P'$ since only one pressure source is required. Furthermore, if $A = B = \pi$ then the conditions for equilibrium are reduced to $$W/2pR = 2PR(L20) - 2P'R(L22)$$

and $$W(Lw)/PR = (L20)^2 + 2[(L22)^2/2 + (L22)(L3)]$$

Figure 5:
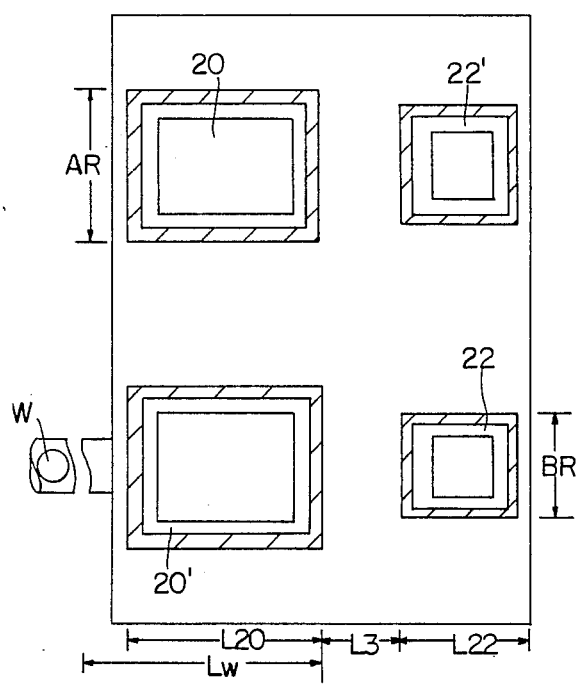
FIG. 5 shows an airbearing design where extra pressure is added to maintain stability of the rotor so that the bearing can operate when the radial load is zero as well as when a net radial load is applied.

Another important application of the invention occurs when the direction of the radial load is constant but the magnitude changes. In this situation, it is necessary to maintain a constant stabilizing pressure so that the bearing is operative even when the load is zero and supply additional pressure to the appropriate areas as the load is applied. For this purpose, a construction as illustrated in FIG. 5 is useful. In addition to the areas 20 and 22, constructed as shown in FIG. 3, there are areas, 20′ and 22′, which are mirror images of areas 20 and 22 respectively, on opposite sides of the cylindrical wall. Now a pressure P is applied to areas 20 and 22 and pressure P′ is applied to areas 20′ and 22′ so that a pressure differential, $p = P - P'$ is established. In order for the rotor to remain in equilibrium, the ratio, W/p must remain constant and equal to the above expressions even as W varies. Devices for maintaining this constant ratio, which are embodiments of this invention, are disclosed in later paragraphs.

Conditions for equilibrium of the rotor for the bearing in FIG. 5 are $$W/p = 2R\ (L20)\sin(A/2) - 2R\ (L22)\sin(B/2)$$

$$(Lw)W/p = R\ (L20)^2 \sin(A/2) + 2R\ [(L22)^2/2 + (L22)(L3)]\sin(B/2)$$

Construction of the airbearing is simplified by setting $A = B = \pi$ in which case each area shares common straight grooves with its mirror image. If also $L3=0$, then all of the areas share one common inner circumferential groove that goes completely around the cylindrical surface.

The embodiment that has been examined in the foregoing paragraphs pertains to a situation where the radial load is applied in a constant direction. In the case where the radial load may be applied in any direction normal to the rotor, the applied load and moment may be balanced by eight air bearing areas arranged as illustrated in FIG. 6. where it has again been imagined that the stator has been cut on one side and flattened out to reveal the air flow grooves and passages. In order to derive the equations of equilibrium, the applied radial load is resolved into two components, w and w', perpendicular to one another. The direction of w is parallel to the normal of areas 20, 22, 20' and 22' while w' is parallel to the normal of areas 20", 22", 20"' and 22"'. Now the conditions for equilibrium of the rotor become $$w/p = 2R\ (L20)\sin(A/2) - 2R\ (L22)\sin(B/2)$$

$$w'/p = 2R\ (L20)\sin(A/2) - 2R\ (L22)\sin(B/2)$$

$$(Lw)w/p = R\ (L20)^2 \sin(A/2) + 2R\ [(L22)^2/2 + (L22)(L3)]\sin(B/2)$$

$$(Lw)w'/p = R\ (L20)^2 \sin(A/2) + 2R\ [(L22)^2/2 + (L22)(L3)]\sin(B/2)$$

Figure 7:
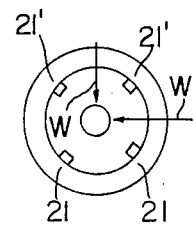
FIG. 7 shows an end view of the rotor and illustrates the resolution of the load, W into two normal components, w and w'.
Figure 6A:
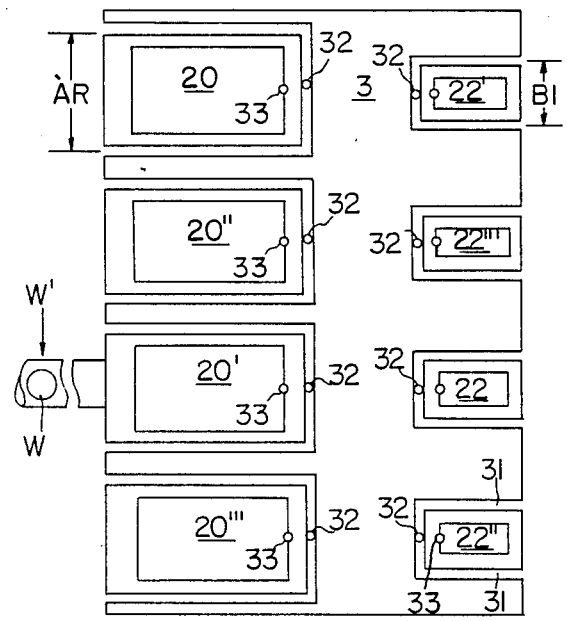
FIGS. 6A and B show air bearing patterns for the case when a radial load is to be applied in an arbitrary direction so that the load can be expressed as two normal components of varying magnitude.
Figure 6B:
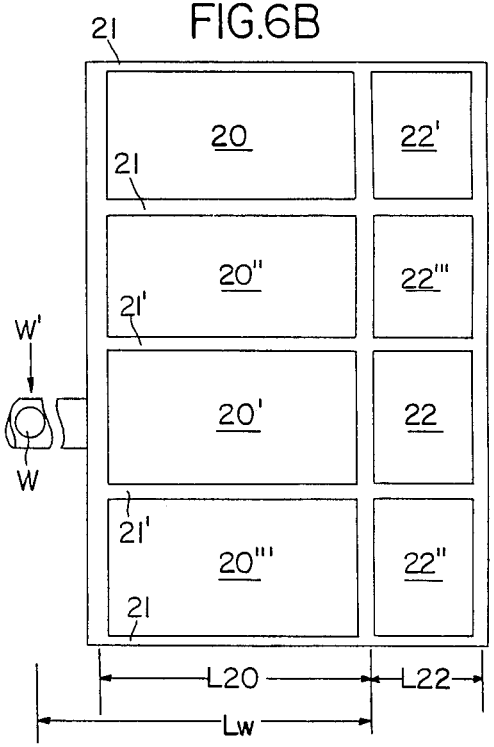

Referring to FIG. 6B, if the length of areas 20, 20', 20" and 20"' is taken to be L20 while the length of areas 22, 22', 22" and 22"' is taken to be L22. and if $A = B = 2\pi/4$ and $L3 = 0$, so that grooves are shared by neighboring areas, then the complexity of construction is reduced. However other values might be useful under some circumstances as shown in FIG. 6A and all are within the scope of the invention. The resolution of radial load W into components, w and w', is represented in FIG. 7 where a cross sectional end view of the stator is presented in order to show orientation of w' and w relative to the air escape grooves 21 and 21'. The four conditions for equilibrium for this selection of dimensions are $$w \times (Lw)/\sqrt{2}\ p'r = (L20')^2/2 + 2(L22') \times [(L3) + (L22')/2]$$

$$w/\sqrt{2}\ p'r = (L20') - (L22')$$

$$w' \times (Lw)/\sqrt{2}\ p''r = (L20'')/2 + (L22'') \times [(L3) + (L22'')/2]$$

and $$w'/\sqrt{2}\ p''r = (L20'') - (L22'').$$

Figure 8:
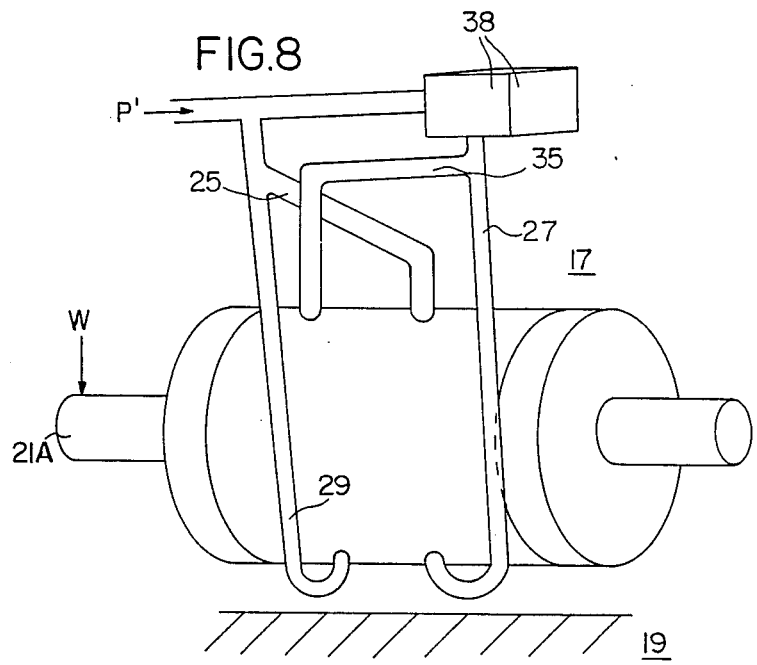
FIG. 8 shows means of adjustimg the pressure to various regions of the airbearing.

In FIG. 8 is shown the air supply construction for the bearing of FIG. 5. Air tubes, 25, 29, 27 and 35 supply air to respective areas 22, 20, 22' and 20' wherein the pressure, P-p, in branches 27 and 35 is controlled by throttle 38.

The distribution of air illustrated in FIG. 8 is for the case shown in FIG. 6B which is applicable when the load is applied in only one direction. When the load is applied in an arbitrary direction, i.e., with reference to FIG. 6B, then two air distribution systems, each identical to the system of FIG. 8, may be used where one system pressureizes areas 20, 20' 22 and 22' and the second system pressureizes areas 20", 20"', 22" and 22"'. Each system would have a throttle 38 and 38' controlled only by w and w', respectively. The means for controlling the throttle is not shown in FIG. 8 but is discussed below with reference to other figures. In these discussions, means will be described for controlling one air distribution system although it will be understood that a second identical system can be incorporated responsive to a perpendicular force component, W', when the situation requires it.

Furthermore, it will be understood that the balance of forces and torques may be achieved either by reducing the pressure in the appropriate areas as the radial load is applied (as discussed in the foregoing paragraphs) or, alternatively, by increasing pressure in the complementary areas by the amount, p. The choice of increasing or decreasing p depends on the comparative rates at which p can be increased or decreased. Because the volume in the air bearing areas is very small, the pressure can be decreased very quickly by throttling at the entry of the airpassages to the orifices. On the other hand, increasing p could require extra time to build up pressure in the supply lines. Therefore, decreasing p may be preferred over increasing p in some situations although either mode of operation is an embodiment of this invention.

When the load to be applied has been predetermined, then the throttles can be preset to provide the pressures, p' and p" that will satisfy the equations for equilibrium.

Figure 9:
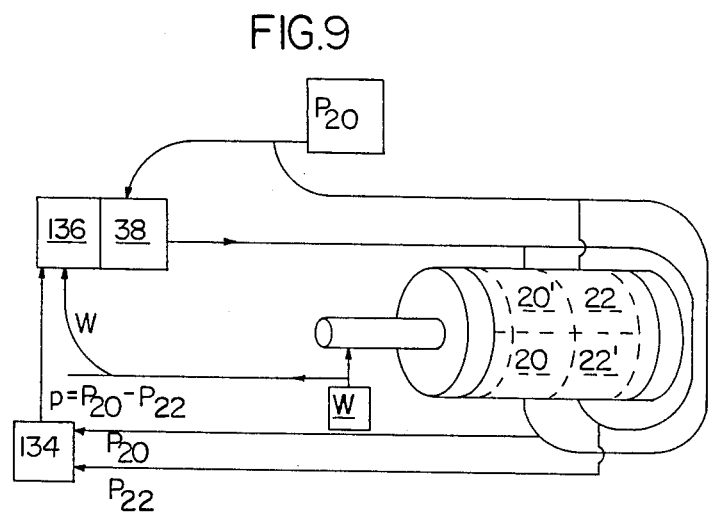
FIG. 9 shows the general approach to feeding back the pressure differential in the airbearing areas in comparison to the radial load in order to establish an equilibrium pressure differential.

When the values of w' and w" vary during the operation of the bearing, then, respectively, a number of means may be used to control the pressure to the various areas and the means selected may depend on the application. The general approach is illustrated schematically for one force compomnnent, W, in FIG. 9. The numbers shown in FIG. 9 correspond to the numbers of the lines and air bearing areas of the stator discussed in connection with FIGS. 5 and 8. Pressures at various locations are indicated as P20 and P22 and force, W, on the shaft is indicated. In addition, there is comparator 134 which presents the signal, p, to one side of a second comparator 136 whose other input is the radial load, W. Comparator 136 sends a signal to the throttle 38 to adjust flow from air source, P, until the radial force is balanced by the pressure differential, p. As will be discussed below, the signals sent to the comparators can be either electrical or hydraulic-pneumatic.

As an example of an application of this invention using hydraulic-pneumatic signals, one may consider a milling operation requiring a large rotational velocity of the cutter. This situation occurs for example when the cutter has a small diameter. An air bearing to support the cutter is an obvious choice.

Figure 10:
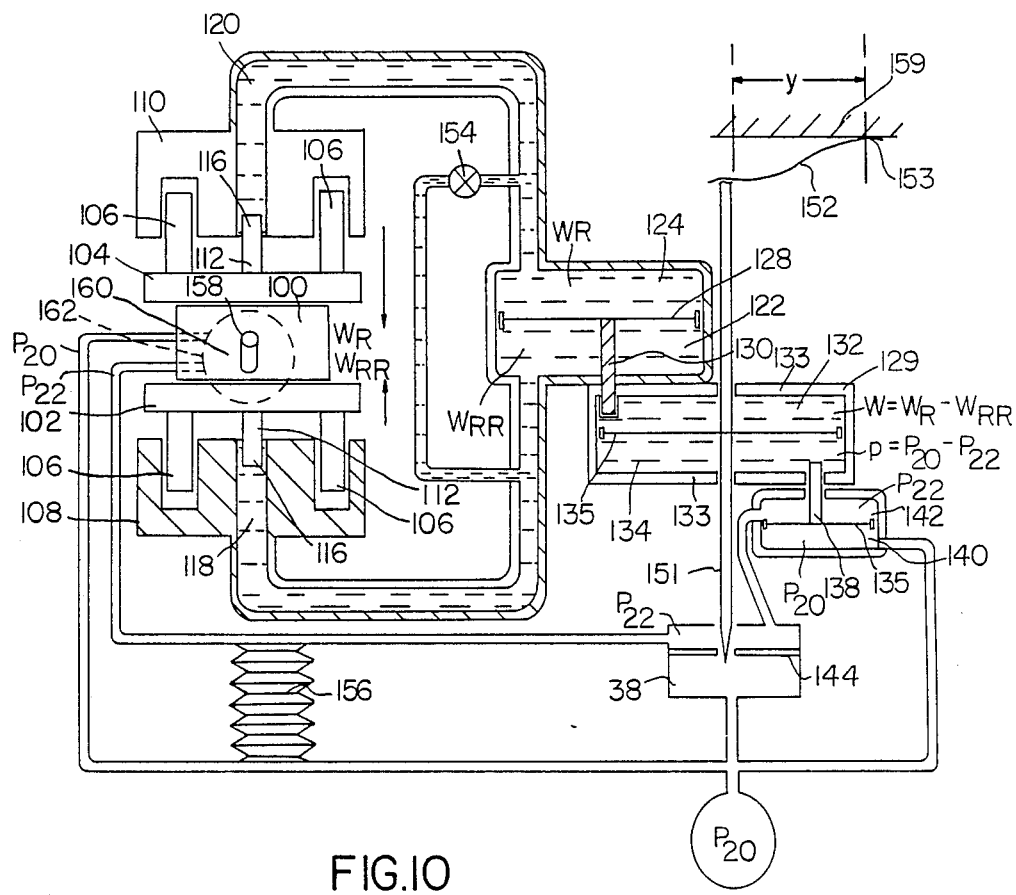
FIG. 10 shows a hydraulic equivalent of FIG. 9. for a case where a cutter is supported by a radial bearing has a radial load imposed by cutting metal.

Referring to FIG. 10, there is shown a workpiece 100 to be milled, held in a chuck where the force, Wr, of one jaw and $-$Wrr of the opposite jaw equals the force W on the cutter and, hence, the resultant radial load on the air bearing, i.e., $W = Wr - Wrr$. The chuck comprises the two sliding sections, 102 and 104, attached to four guide rods 106 which are slideably supported by supporting jaw sections, 108 and 110. An end 112 of a piston is attached to each sliding section and the other end 116 is inserted into a hydraulic chamber 118 and 120 in each supporting jaw section 108 and 110 resectively. The hydraulic chambers communicate with diaphram chambers 122 and 124 respectively which are contained in a pressure comparator and separated by a diaphram 128. A piston rod 130 is attached perpendicularly to the diaphram 128 and protrudes out through the comparator housing into one chamber 132 of a second comparator 133.

A third comparator comprises a diaphram 135 separating a chamber 140, which communicates with area 20, from pressure chamber 142 which communicates with area 22 through the low pressure side of throttle 38. Piston 138 attached at one end to diaphram 135, protrudes into chamber 134 of the second comparator.

The second comparator 133 comprises a housing enclosing a diaphram 135 to which is attached near its midsection a piston rod 151 whose one end protrudes into the chamber of throttle 38 where it operates as a needle valve in cooperation with an orifice in rigid diaphram 144. The other end of piston 151 passes slideably through wall 133 and is spring loaded against a leaf spring 152. The force of the piston 151 against the leaf spring is kx where x is the axial displacement of the piston and k is the spring constant. The spring constant is adjusted by adjusting the distance y between the centerlines of the piston and the attachment of the leaf spring to its base 159.

Pressurized air flows from P20 to area 20 of air bearing 162 (shown as a dash-line circle) and through the controlled orifice of throttle 38 to area 22. Air pressireized to P20 that passes through the throttle is reduced to P22 by virtue of the controlled orifice in diaphram 144.

In operation, when the workpiece 100 moves against the cutter 158, additional force against chuck jaw 104 is generated. This force is transmitted hydraulically through diaphram 128 to diaphram 135 causing the throttle orifice 144 to move toward close. Pressure P22 is thereby reduced causing piston 138 to move into chamber 134, thereby resisting further closing of throttle orifice 144.

Thus a balance is established between the radial force, W, and the pressure differential, p. In order that the system be operative as described, three conditions must be established that may be expressed by three linear equations—:

The relation between Load and pressure differential as discussed above, i.e., $W/p = 2R[(L20) - (L22)] = C$ (a constant)

The pressure drop across the orifice of the throttle 38

$p = Dx$ which states that the pressure drop is proportional to the position, x, of the tapered end of the piston relative to the orifice of the throttle and $HW = Gp + kx$ which is the sum of the forces on the piston 151. The three variables of these conditions are p, x and W. By eliminating these variables between the equations, one is left with a relation between the constants, $HCD = GD + k$ The dimensions of the comparators and throttle are selected on the basis of practicality and to approximately satisfy the equation. As a last step, k is adjusted by adjusting y (discussed above) so as to satify the equations exactly.

When the workpiece 100 is set in the chuck, then before the jaws are tightened, valve 154 is opened so that one side of the diaphram can communicate with the other and equal pressure can be maintained as the jaws are tibghtened. The jaws may be tightened by tightening screw 156 shown as phantom) which forces supporting section 108 toward supporting section 110.

After the work piece is secured, then valve 154 is closed in order to isolate the two halves of the diaphram chamber, 122 and 124. Then the air bearing pressure is turned on so that air flows to the respective airbearing areas of the journal bearing (not shown in FIG. 10) that supports the cutter 158.

A second method of controlling the air pressure responsive to the load is an electronic method in which strain gages respond to the pressure and load changes.

Figure 11:
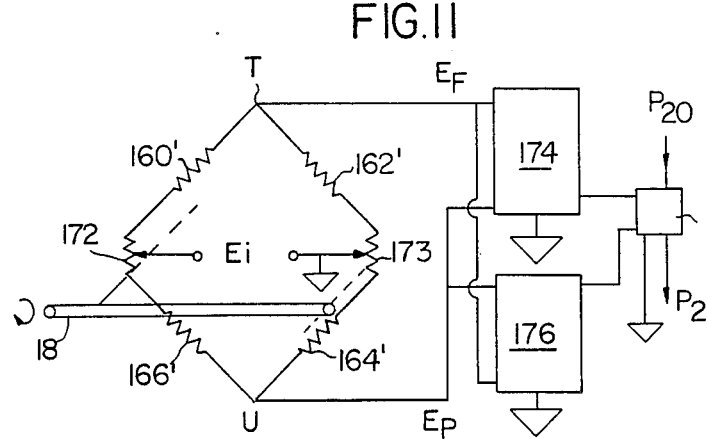
FIG. 11 shows an electrical equivalent of the schematic of FIG. 9 where the resistors of the wheatstone bridge are strain gages shown in FIGS. 12 and 13.
Figure 12:
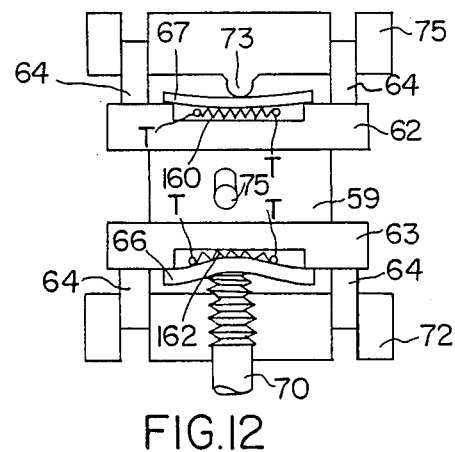
FIG. 12 is a top view of a cutter, supported by a radial bearing, cutting a workpiece held in the jaws of a chuck where each jaw exerts a force that is detected by the strain gages of FIG. 11.

The strain gage arrangement to sense the force on the work piece, which is equivalent to the force on the bearing is presented in FIG. 12. There is shown sliding jaw segments, 62 and 63, attached to guide rods 64 for sliding movement relative to jaw supports 72 and 75. Each jaw segment 62 and 63 comprises a yoke having two ends which support spans 66 and 67. A strain gage, 160 and 162, is on each span as shown also in FIG. 11. Terminals, T, to the strain gages are also shown in FIGS. 11 and 12. A screw 70 is pressed into the middle of one span so as to force the sliding jaw segments together to secure the workpiece 59. A bar 73 provides supporting force of fixed jaw member 75 against the middle of span 67.

When the workpiece is stationary, the cutter is not exerting any force on the workpiece so the strain on each gage is equal to the other so that the bridge of FIG. 11 is electrically balanced. When the chuck is moved, one strain gage is stretched and the other is compressed so as to cause an imbalance of the bridge.

Figure 13:
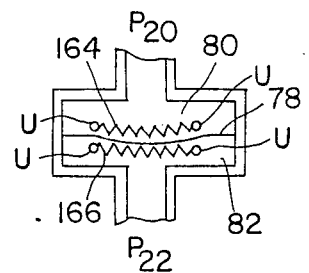
FIG. 13 is a sectional view of a pressure differential unit containing two strain gages shown also in FIG. 11.

The strain gage arrangement to sense the pressure difference, p, is shown in FIG. 13. A diaphram 78 separates two regions 80 and 82 enclosed within a housing. One region communicates to air bearing area 20 where pressure is P20 and second region 82 communicates with area 22, pressure P22. Net force on the diaphram is proportional to $p = P20 - P22$. Wheatstone strain gages 164 and 1 166 are on opposite sides of the diaphram so that when the diaphram is deformed by pressure, p, resistances 164 and 166 change opposite to one another.

Figure 14:
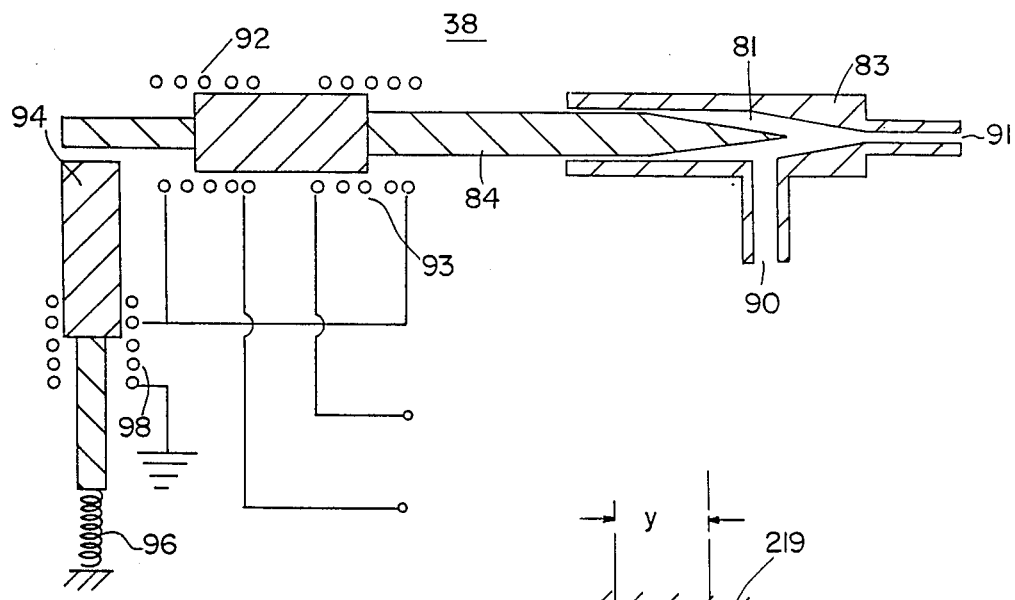
FIG. 14 shows a throttle controlled by braking and voice coils.

The throttle controlling air flow in the bearing responsive to signal from the strain gages according to one embodiment of the invention is shown in FIG. 14. The throttle comprises housing 83 enclosing chambber 81. which ha entry and exit ports 90 and 91 o opening into tapered section of the chamber. Piston 84 slides in the chamber and comprises a shaft with a tapered end. Air flow impedance through the chamber is controlled by position of the piston and determines pressure differential p. A double comparator arrangement for energizing the coils is discussed below. Coil 92 connected to an output terminal of comparator 174 of FIG. 11 moves the piston to increase pressure when it is energized and moves the pisto to decrease pressure when it is energized.

In a further embodiment of the throttle, and still referring to FIG. 14, when the signal from the bridge is zero, indicating the piston is in position to balance the radial load and air bearing pressure, the piston will tend not to remain in that position because of the pressure on the tapered sides of the piston. Therefore, a brake 94 is incorporated which is biased by a spring 96 to hold the throttle piston when no current is passing through the coil from either comparator. When either throttle coil 92 or 93 are energized, coil 98 is energize so that the brake is released.

A circuit that can interface load changes with changes of pressure differential to maintain equilibrium is shown schematically in FIG. 11 and comprises a wheatstone bridge. Strain gage resistors change in opposite directions due to the radial load as discussed above. Note that the total resistance in each arm of the bridge equlas the strain gage resistance plus the fractional resistance of the trimming potentiometer (172 or 173) determined by the settings of the potentiometer. Terminals, T, to resistors 164' and 166' are shown in FIGS. 11 and 12. Strain gage resistors 164' and 166' change in opposite directions due to pressure differential changes P20—P22 in the air bearing. When P20=P22 and the radial load is zero, the trimming potentiometers, 172 and 173, are adjusted so that the totlal resistance in each arm (R160)=(R162) and (R(R164)=(R166) and the ratio, (R160/(R164) equals a value that will compensate for differences between the devices used to detect W and p, as will be shown in following paragraphs.

When the force and pressure differential are in equilibrium it is also required that $$E_f - E_p = 0$$

When a load, W, is applied, resistance R160 changes by $+r$ and resistance R162 changes by $-r$.

r is proportional to the load, W, i.e., $$r = AW$$

Therefore, $$E_f/E_o = \tfrac{1}{2} + r/2(R160) = \tfrac{1}{2} + AW/2(R160)$$

When the throttle opens; pressure in the air bearing generates a resistance change in 164 of $r'$ and in 166 of $-r'$. The resistance change is proportional to the pressure differential in the bearing. The pressure differential may be written as $(p+d)$ where p is the pressure differential that must be established in order to satisfy the condition for equilibrium, i.e., $$r'/R = B(p+d)$$

or $$E_p/E_o = \tfrac{1}{2} + B(p+d)/2(R164)$$

Now the signal from the wheatstone bridge is ($E_f - E_p$) so if we choose $Aw/2(R160) = Bp/2(R164)$ i.e., $$W/p = B/A = C = (L20 - L22) \times \text{bearing diameter,}$$

then, the signal from the wheatstone bridge, is $$(E_f - E_p) = -Bd/2(R164)$$

or, in other words, the signal from the bridge is simply proportional to the deviation of the bearing pressure differential from the value required for equilibrium. Therefore, in accordance with the embodiment of the invention, the signal from the bridge is amplified and applied to the throttle so as to cause the throttle to adjust the pressure differential of the bearing toward the value required for equilibrium.

As was disclosed above, the throttle 38 is constructed so that when $E_p > E_f$, the throttle will decrease air flow and when $E_p < E_f 0$, the throttle will increase air flow. In order to accomplish this, the signal, $E_f - E_p$ is applied to two voltage comparators, 174 and 176 in FIG. 11. When $E_f - E_p > 0$ (indicating that p must be increased) comparator 174 conducts so that current in throttle coil 92 causes the throttle to open. When $E_f - E_p < 0$) indicating that p must be decreased, comparator 178 conducts sending current to throttle coil 93 and the throttle closes. So the action of both coils drives the throttle to the point where $E_f = E_p = 0$. Comparators that are useful are described in National Semiconductor Corp Linear Data Book #1. Santa Clara, Ca.

Sensitivity constants, A and B, are functions of the strain g gages, diaphrams, etc. and so do not necessarily satisfy and condition for equilibrium. It is an embodiment of this invention to interpose compemsating potentiometers, 172 and 173, into the bride as shown in FIG. 11. The position of the adjustable center tap determines resistance values, (R160) and (R164). Therefore, by adjusting the center taps 172 and 173, the condition, $A(R160)/B(R162) = (L20) - (L22)$ can be established by shifting the centertaps to aceive the desired values of resistance. Since it is necessary to maintain the equality $$(R160) = (R162) \text{ and } (R164) = (R166)$$

a convenient arrangement is to gang the two potentiometers together so that identical changes in (R160) and (R162) and identical changes in (R164) and (R166) are made as the common shaft is turned. This construction is represented by the shaft 180 in FIG. 11 which is intended to show the two potentiometers ganged together.

The procedure to adjust the potentiometers is performed with the bearing stationary (not rotating). The first step apply a load, W which is larger than any load anticpated in practice. Then a pressure, P is applied to all areas of the bearing that is greater than the pressure differential that is required to balance the bearing, i.e., P greater than $2RW[(L20) - (L22)]$. Then the common shaft of the potentiometer is adjusted until the rotor is free. If the potentiometer is turned too far in one direction, the rotor will tip in one direction. If the potentiometer is turned too far in the opposite direction, the rotor will tip in the opposite direction.

In the foregoing description of the preferred embodiment, two methods were presented regarding the detection of the radial load in order to control the distribution of the air bearing pressure. In these embodiments, the sensors were placed so as to directly detect the load.

However the sensors could be placed in a variety of positions depending on the application. In some instances, the most advantageous means for sensing the radial load is to sense the power source that is driving the load. In the case of the milling operation discussed above the electrical power that is used to drive the workpiece against the cutter may be sensed as a means of controlling the pressure. differential, p.

Figure 15:
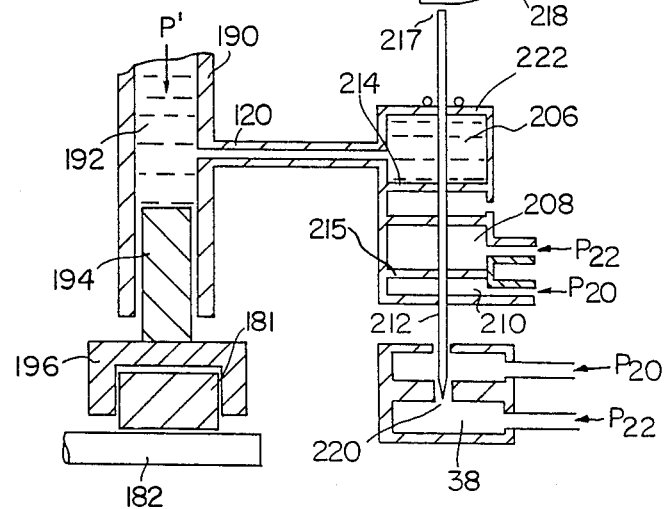
FIG. 15 shows application of force on one side of a rotor shaft hydraulically and sensing hydraulic pressure to control bearing pressure.

FIG. 15, illustrates an application where the force applied to the bearing is one sided, e.g., when the load is applied by a roller 181 or other means pressing in one direction on one side of the shaft 182 of an air bearing. There is shown a hydraulic cylinder 190 enclosing within its chamber 192 one end of a ram 194 whose other end supports a yoke 196 that straddles a roller 181 in rolling contact with an extension of a rotor 182. Hydraulic pressure, P', used to apply force on the ram is transmitted through channel 120 to one chamber 206 of a hydraulic comparator. The comparator also comprises two other chambers, 208 which is subject to pressure, P22, and 210 which is subject to pressure P20. A ram 212, attached at one end to a leaf spring 218, passes slideably through the outer wall 222 of a chamber 206, is attached near its midsection to a diaphram 214, passes slideably through a wall of chamber 208, is attached near its midsection to a diaphram 215 which separates chambers, 208 and 210, passes slideably through an outer wall of chamber 210 into the chamber of throttle 38 where its second end is tapered and controls air current through the orifice 220 of a diaphram in throttle 38. The ram is thereby subject to three forces—the load, W, exerted through diaphram 214, the pressure differential, p, exerted by diaphram 215, and the spring 218. Foce exerted by the spring is kx where k is spring constant and x is the displacement of the ram which also determines flow through the throttle orifice, 220. The three equations governing the design of the system are $W/p=C$ where C is a function of the air bearing dimensions as discussed above, $J(W/H-p)=kx$ where H is the area of load ram 194 and J is the area of diaphrams 214 and 215.

$p=Fx$ where F is the rate of change of the pressure differential p across orifice 220 as displacement, x, changes.

These three equations have three variables, x, p and w so by eliminating them one is left with the required relation between the design parameters of the system—

$J(C/H-i1)=k/F$

F, J, C and H are determined by practicality Referring to FIG. 15, the force constant k is selected to satisfy the equation by adjusting the leverage distance, y, of the leaf spring.

Figure 16:
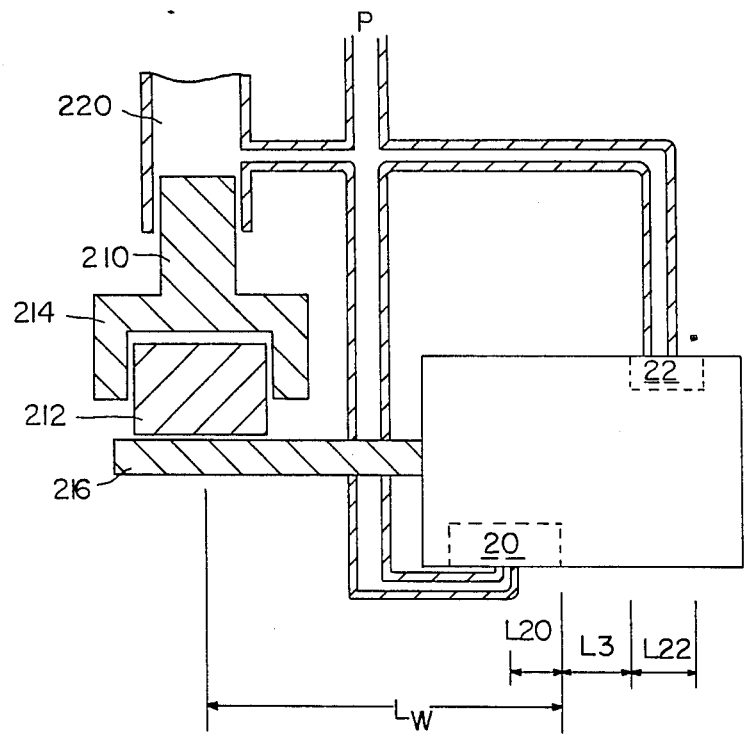
FIG. 16 shows application of air pressure to exert a load against the rotor shaft and applying the same pressure to air bearing areas to balance force and moment on the bearing.

In some applications, the system may be designed so that the same source applies pressure to both the load and the bearing areas so that the only control that is needed is means to control the pressure source. to apply the desired load. This construction is shown in FIG. 16. where a pnuematic ram forces a roller supported by a yoke against shaft 216 of bearing 218. Pressureized air is supplied pnuematic cylinder 220 enclosing one end of the ram and area 22 on the load side of the bearing and area 20 on the opposite side. The radial load, W, equal pressure, P, multiplied by cross sectional area, S, of the ram. Then if S20 and S22 are the projected areas 20 and 22 toward the axis of the bearing, then the conditions for equilibrium are $S+(S22)=(S20)$ and $S(Lw)=(S20)(L20/2)+(S22)(L3)+(S22)(L22)/2$ where L20 and L22 and L3 are defined as in the above discussions with respect to FIG. 3. If it is required to operate the bearing pressure so as to reduce the load to zero. then a pattern such as FIG. 5 must be used in order that a biasing pressure, P', would be applied to all of the areas of FIG. 5 in addition to the load pressure, p, which is applied only to the load areas areas 20 and 22.

Figure 18:
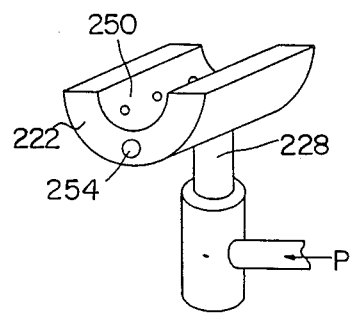
FIG. 18 shows an isometric view of the arrangement of FIG. 17.

In the situation where there is space available on the side of the shaft 224 opposite the load as in FIG. 17, The bearing takes the form of a half shell as shown in cross section in FIG. 17 and in FIG. 18. There is shown the half shell air bearing 222 partly enclosing the rotor shaft 224. The bearing shell 222 is attached to a ram 228 so that the ram is forced toward the shaft 224 by the ram whose other end extends into the pressureized chamber 230. A roller 234 supported on a yoke 232 is forced toward the bearing by a ram 236 whose other end extends into a pressureized chamber 238. Pressureized air is fed to the interface 240 between the shaft 224 and half shell bearing 222 through a channel 242 leading from chamber 230, through a flow control chamber 248 and through air passage branches 250 to the interface. A tapered plug 254, positioned by threaded adjustment 256, determines the flow rate through passage 242.

The cross sectional areas A of both rams are equal and since they are supplied by the same pressure source, P, the net force on the shaft from both rams is zero. The area A of rams 228 is less than the area of the interface area D projected toward the shaft. Therefore the force at the interface of the halfshell against the shaft is greater if the pressure in the interface is equal to the pressure in the chamber 230. Therefore the separation d at the interface will increase allowing air to escape around the edges of the interface so that the pressure in the interface 240 will decrease to a point where the force at the interface equals force due to the ram 228 and thereby determines the equilibrium value of the interface separation, n.

The air control tapered plug controls air flow to the interface in a manner that is a unique embodiment of this invention. As was pointed out in the discussion of prior art, conventional practice is to supply air to the bearing surface through a tubular channel that is restricted close to the bearing surface (air bearing area) by a neck section having a diameter that is very small compared to the main length of channel. This restriction is present in order to provide just sufficient air current to support the bearing. Furthermore, the orifice (neck section) must be close to the bearing be "hard" (stiff). i.e., the limited supply of air tends to prevent spurious excursions of the bearing spacing. However, it was also pointed out that this construction is susceptible to sonic vibrations due to the large velocity of air through the orifice. The tapered plug construction 254 of FIG. 17 provides the advantages of the jewelled orifice construction yet avoids the disadvantages. First of all, the area between the tapered plug and chamber is much larger than the surface area of a round chamber of identical cross sectional area. This means that air molecules passing through the tapered chambe would be subject to more collisions with the wall than would molecules passing through the donut orifice. and would thereby lose spped due to frictional forces encountered with the wall. Secondly, a means of controlling the air flow that is not available with the fixed orifices of the prior art.

All of the foregoing discussion has been directed toward applying the central theme of this invention to an air bearing having cylindrical symmetry about the axis. However, it is apparent that the principle of balanced forces and torques applies also to other shapes, such as the conical bearing shown in FIG. 19. There is shown a stator 310 with a conical chamber 312 enclosing a rotor with a tapered center section 315 having a threaded bore on each end, 317 and 320. A shaft 319 screws into each end and each shaft ha a threaded end which protrudes so that an end plate 324, may be screwed onto each shaft. The threads, A and B, on each shaft are different, e.g., A=36 and B=40 threads per inch. Tie bolts 328 prevent the end plates from rotating with respect to the tapered section. Therefore, when each shaft is turned, ery fine adjustment of the bearing clearances is acheived. because of the differential screw.

Wherea the prior art technique for manufacturing a cylindrical rotor requires precise lapping of the cylindrical section of the stator chamber and rotor shaft in separate operations, and then assembled with the hope that close tolerance has been acheived—with the tapered construction, the bearing surfaces may be machined to machine (approximate) tolerances and then assembled so that the tapered stator chamber and rotor section can be lapped together to acheive conformity. After the lapped parts are assembled, the shafts are adjusted to attain the desired bearing clearance.

When the slope of the taper is small, the conditions for equilibrium of forces and moments that were expressed for the cylindrical rotor hold for the tapered rotor as well. When the taper is large, well known methods of integral calculus show that the force and moment on a region bounded by a pair of straight air e escape grooves connecting the ends of a pair of circumferential grooves (as dexcribed in the cylindrical case) becomes—for the force, F,—

$$F = p(ax^2 + 2R'x/2 - ax'^2 - 2R'x'/2) \sin(A/2)$$

and for the moment—M—

$$M = p(2ax^3 + 3R'x^2 - 2ax'^3 - 3R'x'^2)(\sin(A/2))/3$$

As illustrated in FIG. 20, x is the distance of one circumferential groove to the small end of the taper 3d measured along the axis a and x' is the distance of the other circumferential groove (to the small end of the tapered section), R' is the radius of the small end of the taper and a is the slope of the taper. As with the cylindrical rotor, the condition for equilibrium is that the sum of all forces and moments on the rotor must equal zero.

All of the above variations are within the scope of the invention since the general approach is to sense a quantity that is proportional to to the radial load and establish a pressure differential between various areas in the air bearing in order to haveero zero net force and moment on the rotor.

It should be noted that various modifications within the scope of this invention can be made by one of ordinary skill in the art without departing from the spirit thereof. I therefore wish my invention to be defined by the scope of the appended clams as broadly as the prior art will permit and in view of the specification if need be.

I claim:

1. An air bearing which includes a rotor with a rotor surface having axial symmetry and two ends having a shaft protruding from at least one of said rotor ends and a location on at least one of said shafts where a radial force, W, may be applied in a force direction, a stator having a chamber enclosing said rotor with an internal surface having axial symmetry and bounded by an end nearest to said force location and an end fartherest from said force location, said chamber internal surface conforming and adjacent to said rotor surface to form an air bearing space, which bearing comprises:

said air bearing space including a plurality of air bearing areas wherein each area is bounded by air escape grooves on said internal surface which communicate with the ambient environment and each area has an air supply passage;

means for supplying air at a single selected pressure to all of said air passages wherein said pressure is proportional to a radial load applied to said rotor;

each said area having a size and location with respect to said ends of said axially symmetric internal surface and said single selected pressure is supplied to all of said air passages so that the net moment and force on said rotor is zero when a radial force is applied to said rotor.

2. An air bearing as in claim 1 wherein said rotor means further comprises:

a tapered section with a smallest end and a largest end;

a flange;

a means to attach said flange to said largest end;

a plate;

a means to attach said plate to said smallest end.

3. An air bearing means as in claim 1 wherein said stator means includes a wall and said wall encloses a tapered passage intersecting said air passage and wherein said air bearing means further comprises a tapered plug positioned ins in said tapered passage and means to shift said tapered plug thereby controlling air flow through said air passage.

4. An air bearing means as in claim 1 wherein said rotor has a radius, R;

a first one of said areas is bounded by a first circumferential one of said grooves adjacent to said nearest end and a second circumferential one of said grooves separated by a distance, L20, from said first groove wherein both first and second circumferential grooves extend an angular distance, A, around said cylindrical surface thereby defining groove ends of said circumferential grooves;

said first area has a first pair of straight bounding grooves connecting said first and second circumferential grooves at said groove ends;

said first area faces an opposite direction to said force direction;

a second one of said areas is bounded by a third circumferential one of said grooves adjacent to said fartherest end and a fourth circumferential one of said grooves separated by a distance, L22, from said third groove wherein both third and fourth circumferential grooves extend an angular distance, B, around said cylinder thereby defining ends of said third and fourth circumferential grooves;

said second area has a second pair of straight grooves connecting said ends of said third and fourth circumferential grooves;

said second circumferential groove is separated from said fourth circumfertial groove measured parallel to an axis of said cylindrical surface by a distance, L3;

said force location is a distance, Lw, from said second circumferential groove measured axially along said cylindrical surface;

a first one of said passageways connects said first area to a source of pressurized air at pressure, p, and a second one of said passageways connects said second area to a source of pressurized air at pressure, p';

said values of p, p', R, A, B, L20, L22, Lw and L3 are selected to satisfy in relation to the applied load, w, to satisfy $W + 2p'R\ (L22)\ \sin\ (B/2) - 2pR\ (L20)\ \sin\ (A/2) = 0$ $W(Lw) = pR\ (L20)^2\ \sin\ (A/2) + 2p'R\ (L22)$
$[(L3) + (L22)/2]\ \sin\ (B/2).$ 5. An air bearing means as in claim 4 wherein p=p'.

6. An air bearing means as in claim 5 wherein $A=B=\pi$ and L3=0 so that said second and fourth grooves constitute one continuous circumferential groove going completely around said internal surface.

7. An air bearing means as in claim 1 wherein:
said rotor has a radius, R;
a first of said areas faces opposite to said force direction and a second of said areas faces in said force direction and both first and second areas are bounded, respectively by a first and second circumferential one of said grooves adjacent to said nearest end and third and fourth circumferential ones of said grooves spaced a distance L20 from said first and second circumferential grooves respectively, and said first and second areas are further boinded by said grooves that are straight, and connect respectively ends of said first and second curcumferential grooves to ends of said third and fourth circumferential grooves;
a third one of said areas facing said force direction and a fourth one of said areas facing opposite to said force direction, both third and fourth areas bounded, respectively, by fifth and sixth circumferential ones of said grooves adjacent to said fartherest end and a seventh and eighth circumferential ones of said grooves spaced a distance L22 from said fifth and sixth circumferential grooves, respectively;
each said first, second, third and fourth circumferential groove extends an angular distance, A measured circumferentially around said internal cylindrical surface;
each said fifth, sixth seventh and eighth circumferential groove extends an angular distance, B, measured circumferentially around said internal cylindrical surface;
said third and fourth circumferential grooves are separated from said seventh and eighth circumferential grooves, respectively, by a distance, L3, and are separated from said force location by a distance, Lw, measured axially along said cylindrical chamber;
said pressure control means supplies a first value of pressure, P20, to said first and third areas and a second value of pressure, P22, to said second and fourth areas so that a pressure differential between P20 and P22 is p=P20−P22;
said values, L20, L22, Lw, L3, A, B and p are selected in relation to applied load, w, to satisfy conditions, $W/2pR = (L20)\ \sin\ (A/2) - (L22)\ \sin\ (B/2)$ $W(Lw) = pR\{\sin\ [(A)/2]\}(L20)^2 + 2pR(L22)$
$[(L3) + (L22)/2]\ \sin\ (B/2).$ 8. An air bearing means as in claim 7 wherein $A=B=\pi$ so that said straight grooves bounding said first area also bound said second area. and said straight grooves bounding said third area also bound said fourth area.

9. An air bearing means as in claim 8 wherein L3=0 so that said second, fourth, seventh and eighth grooves combine to form one circumferential groove that is formed circumferentially completely around said internal surface.

10. An airbearing means as in claim 9 wherein a second radial force, w', is applied to said shaft at said load location in a direction perpendicular to said direction of application of force, w, and said airbearing means further comprises:
a fifth one of said areas facing opposite to said perpendicular direction and a sixth one of said areas facing said perpendicular direction and both fifth and sixth areas are bounded respectively by a ninth and tenth circumferential one of said grooves adjacent to said nearest end and an eleventh and twelfth circumferential one of said grooves spaced a distance L20 from said ninth and tenth grooves respectively;
a seventh one of said areas facing opposite to said perpendicular direction and an eighth one of said areas facing in said perpendicular direction and both seventh and eighth areas bounded respectively by a thirteenth and fourteenth circumferential one of said grooves adjacent to said fartherest end and by a fifteenth and sixteenth circumferential one of said grooves spaced a distance L22 from said thirteenth and fourteenth grooves, respectively,
each of said ninth through twelfth circumferential grooves extends an angular distance, A, around said cylindrical surface;
each of said thirteenth through sixteenth circumferential grooves extends an angular distance, B around said cylindrical surface;
each said fifth through eighth area is bounded by straight grooves which connect ends of said respective circumferential grooves;
said pressure control means applies a pressure P20' to said fifth and seventh areas and a pressure, P22', to said sixth and eighth areas so as to generate a pressure differential, p'=P20'−P22';
said quantity, p' and B are selected to satisfy the relation, $w' = 2p'R\ (L20)\ \sin\ (A/2) - 2p'R\ (L22)\ \sin\ (B/2)$ $w'(Lw) = 2p'R\{\sin\ (A/2)\}(L20)^2/2 + (L22)\{(L22)/2 + (L3)\}\ \sin\ (B/2)].$ 11. An air bearing means as in claim 10 wherein $A=B=\pi/2$ so that each said area shares a common straight groove with its circumferential neighbor.

12. An air bearing as in claim 11 wherein L3=0.

13. An air bearing as in claim 1 wherein said pressure control means further comprises;
a force responsive means that produces a force signal proportional to the radial load;
a pressure responsive means that produces a pressure signal proportional to a difference in pressures between selected ones of said areas;
a comparator means that produces a signal proportional to the difference of said force signal and said pressure signal;

a throttle means responsive to said comparator signal that controls air flow to at least one of said airbearing areas.

14. An air bearing as in claim 13 wherein
said force signal is a voltage;
said pressure signal is a voltage;
said comparator means comprises input terminals for receiving said force and pressure voltages and a first comparator with an input terminal for receiving said force voltage and an input terminal for receiving said pressure voltage and a ground and an output terminal that emits a voltage when said force voltage is greater than said pressure voltage and a second comparator with an input terminal for receiving said force voltage and an input terminal for receiving said force voltage and an input terminal for receiving said pressure signal and a ground and output terminals that emit a voltage when said pressure voltage is greater than said force voltage.

15. An air bearing means as in claim 14 wherein said throttle means further comprises:
a piston bar having a largest diameter at a first end, a tapered middle section and a section with a smallest diameter at a second end;
a housing with a tapered chamber enclosing said tapered section and an opening through which said large diameter section protrudes and an opening through which said smallest diameter section protrudes and an entry port adjacent to one end of said tapered section and leading to an air supply and an exit port adjacent to a second end of said tapered section and leading to at least one of said airbearing areas;
a first coil enclosing said piston first end and having two terminals for receiving said comparator signal and moves said piston in a first direction when said first coil terminals are energized;
a second coil enclosing said piston second end and having two terminals for receivinng said comparator signal and moves said piston in said second direction when said second terminals are energized;
a brake having two input terminals that brakes said piston when said brake terminals are energized;
so that when said radial force is greater than said pressure force, said piston moves to a position so as to increase said pressure difference and when said pressure force is greater than said force pressure, said piston moves to a position so as to decrease said pressure difference.

16. An air bearing means as in claim 15 which further comprises a first second, third and fourth terminal wherein
said first terminal is connected to ground;
an energizing voltage is applied between said first and third terminals:
said second terminal is connected to said first and second comparator input terminals for receiving said force voltage;
said fourth terminal is connected to said first and second comparator input terminals for receiving said pressure voltage;
and wherein said force responsive means further comprises a strain gage connected between said first and second terminals and whose resistance increases when said radial load increases and a strain gage connected between said second and third terminals and whose resistance decreases when said radial load increases;
said pressure responsive means further comprises a strain gage connected between said third and fourth teminals which increases when said pressure voltage increases and a strain gage connected between said fourth and first terminals which increases when said pressure voltage increases.

17. An air bearing as in claim 13 wherein said force signal, pressure signal and comparator signal are hydraulic-pneumatic.

18. An air bearing means as in claim 17 wherein said pressure responsive means further comprises:
a housing with a wall having a wall opening and encloses a chamber;
a moveable diaphram that separates said chamber into two compartments;
two tubes that provide communication between each compartment and a first and second pressureized air bearing area, respectively;
a pressure differential piston having one end attached to said diaphram and a second end passing through said wall to communicate with said comparator means and slides in one direction or the other direction in response to a difference in pressure between two said air bearing regions and
wherein said force responsive means further comprises a force piston that slides in one direction when said radial force decreases and slides in an opposite direction when said radial force increases and wherein said force piston has an end that is coupled to said comparator means in order that said comparator means may detect changes in said radial force and
said comparator means further comprises:
a comparator housing with a wall enclosing a comparator chamber;
a diaphram separating said comparator chamber into two comparator compartments wherein one said comparator compartment receives said force piston through a hole in said comparator wall and a sec said comparator compartment receives said pressure differential piston through another hole in said comparator wall;
a comparator piston having one end attached to said comparator diaphram and a second end passing out through a hole in said comparator wall for coupling to said throttle means
said throttle means further comprises a throttle housing with a wall enclosing a throttle chamber, having an entry port connected to a pressureized air supply, an exit port leading to at least one of said air bearing areas and an opening through which passes said second end of said comparator piston that may slide in one direction so as to diminish said exit port to decrease air flow to said area or in the opposite direction to enlarge said exit port in order to increase air flow to said area.

19. An air bearing as in claim 1 wherein said fluid is hydraulic fluid.

20. An air bearing means as in claim 1 which further comprises a means to apply said radial load.

21. An air bearing means as in claim 20 wherein said load applying means further comprises:
a force member;
a ram having one end attached to said force member and a second end;

a housing with a wall enclosing an internal chamber and an opening in said wall through which said ram protrudes into said chamber and an entry through said wall for admitting pressureized fluid thereby applying force to said force member.

22. An air bearing as in claim 21 wherein said air bearing further comprises an air passage means that permits said housing chamber to communicate with at least one of said air bearing areas and with a source of pressureized air.

23. An air bearing means as in claim 21 wherein said force member further comprises a roller positioned adjacent to said shaft.

24. An air bearing means as in claim 23 wherein said force member further comprises a yoke having two ends between which is rotatably mounted said roller.

25. An air bearing as in claim 1 wherein said fluid is air.

26. An air bearing means as in claim 1 wherein said shaft has a shaft surface and said stator further comprises a shell having a concave surface adjacent to said shaft surface with an air passage through said shell and opening onto said concave surface to provide airbearing support to said shaft.

27. An air bearing means as in claim 26 which further comprises:
a ram having one end attached to said shell and a second end with an end surface whereby said air peassge through said shell also passes through said ram and open out onto said end surface;
a housing with a wall enclosing a chamber and a first opening in said wall through which said second end of said ram protrudes into said chamber and a second opening for admitting pressureized air.

28. An air bearing means as in claim 27 which further comprises means to control air flow through said air passages in said shell.

29. An air bearing means as in claim 28 wherein said means to control air flow comprises:
said shell having a tapered chamber intersecting said air passage and having a smallest end opening to said concave surface and having a largest end threaded and opening out through said shell wall;
a tapered plug positioned inside said tapered chamber with a threaded end engaging said threaded length inside said tapered chamber to provide control of air flow through said air passages by turnably adjusting said tapered plug.

* * * * *